United States Patent [19]
Serra

[11] Patent Number: 5,587,578
[45] Date of Patent: *Dec. 24, 1996

[54] METHOD AND APPARATUS FOR OPTIMIZING MAGNETIC FLUX THROUGH AN ELECTRONIC LABEL OF A CONTACT-FREE IDENTIFICATION SYSTEM

[75] Inventor: Didier Serra, Marseille, France

[73] Assignee: Gemplus, Gemenos, France

[*] Notice: The term of this patent shall not extend beyond the expiration date of Pat. No. 5,583,330.

[21] Appl. No.: 512,945

[22] Filed: Aug. 9, 1995

[30] Foreign Application Priority Data

Aug. 10, 1994 [FR] France ................................. 94 10027

[51] Int. Cl.⁶ .................................................... G06K 19/06
[52] U.S. Cl. .......................... 235/492; 235/375; 235/435; 235/449; 235/491; 336/117
[58] Field of Search ................................... 235/375, 435, 235/449, 491, 492; 336/117, 118, 119

[56] References Cited

U.S. PATENT DOCUMENTS

| | | | |
|---|---|---|---|
| 4,782,342 | 11/1988 | Walton | 340/941 |
| 4,800,978 | 1/1989 | Wasa et al. | 336/119 X |

FOREIGN PATENT DOCUMENTS

| | | |
|---|---|---|
| 0344490 | 12/1989 | European Pat. Off. . |
| 0376062 | 7/1990 | European Pat. Off. . |
| 0586083 | 3/1994 | European Pat. Off. . |
| 9313494 | 7/1993 | France . |
| 2077555 | 12/1981 | United Kingdom . |

*Primary Examiner*—Donald T. Hajec
*Assistant Examiner*—Michael G. Lee
*Attorney, Agent, or Firm*—Nilles & Nilles, S.C.

[57] ABSTRACT

The system comprises firstly an electronic label and, secondly, a label reader. The label comprises a foil made of a material that conducts magnetic fields and has a low coercive field. It is placed against the antenna and is parallel to the antenna to form a shield and a flux concentrator for the electromagnetic waves. The reader comprises bars surrounded by coils to generate a magnetic field so that the lines of said magnetic field can get looped in passing into the label when the reader is placed in the vicinity of this label. If the object on which the label is placed is provided with a protective cup, the invention provides for positioning plates, made of a material similar to that of the foil, between the bars and the protective cup. Application to the remote identification of objects, in particular metal objects such as gas cylinders.

20 Claims, 2 Drawing Sheets

METHOD AND APPARATUS FOR OPTIMIZING MAGNETIC FLUX THROUGH AN ELECTRONIC LABEL OF A CONTACT-FREE IDENTIFICATION SYSTEM

BACKGROUND OF THE INVENTION

1. Field of the Invention

The present invention relates to an electronic label and to a system for the contact-free identification of objects, notably metal objects such as for example gas cylinders.

To reference and identify such objects, there are known ways of affixing electronic labels to them. Such labels are each provided with a device for the reception and transmission of electromagnetic waves coupled with an electronic module enabling the processing of the signals received and the re-transmission of other signals comprising notably a message for the identification of the label and hence of the object to which it is affixed. Furthermore, the system has a reader comprising a device for the transmission/reception of electromagnetic waves to transmit information elements between a data terminal and said electronic label.

The reader fulfils several functions and is notably used to:

send the label the power needed for its operation, the label having no specific independent source of power, send the label data elements coming from the terminals, these data elements being possibly capable of being recorded in a memory with which the label is provided, receive data elements that come from the label and are specific to this label, notably in order to identify this label.

To carry out these various operations of transmission, the transmission/reception device of the reader has an antenna, formed for example by a coil with a ferrite core. This antenna is used for transmission and reception.

The label too has an antenna for the reception of the electromagnetic waves sent by the reader, the same antenna being used also to transmit data elements to the reader. In reception mode, the antenna is a means of reception by induction of the power coming from the reader, as well as a means of reception of the data sent out by this reader. The antenna is connected to an electronic circuit, for example an electronic chip, comprising the means needed to demodulate the signals received by the antenna, decode these signals and store them, as well as to encode and modulate the signals to be re-transmitted.

A major problem of these systems is that of enabling the label to receive the power needed for its operation with maximum efficiency so as to make it possible to reduce the power of the electromagnetic radiation sent out by the reader and limit the space requirement of the antennas and enable transmission of the power and signals without undergoing the constraint of an excessively short transmission distance.

2. Description of the Prior Art

In an attempt to resolve this problem, it has already been proposed to make a label antenna of the ferrite container type, formed by a cylindrical ferrite element having, on one of its plane faces, a ring-shaped groove within which a coil is housed. Such an antenna is necessarily fixed to the object to be identified, with its axis perpendicular to the surface of the object. Owing to the relatively great height of the ferrite container, this antenna takes up space in a cumbersome way in the axial direction. To overcome this problem, there is a known way of embedding the label on the surface of the object. For example, there is a known way of placing labels of this type in a housing hollowed out in the knob of the control valve of a gas cylinder. Therefore, the antenna is necessarily small-sized.

The antenna of the reader is made similarly by means of a coil whose axis has to be placed substantially in the direction of the axis of the antenna of the label in order to provide for the most efficient power transmission possible. To increase the efficiency, reasons related to the availability of space make it impossible in practice to implement the approach wherein the diametrical dimension of the antenna of the label is increased to pick up more of the flux lines sent by the reader. It has thus proved to be the case that the distance between the reader and the label can hardly exceed 5 mm with such a system.

Another approach envisaged is that of making the antenna of the label in the form of a coil surrounding an elongated ferrite rod, for example with a length of 15 mm and a diameter of 3 mm.

In order that the flux lines of the magnetic field may flow in the ferrite rod in the axial direction of the coil, this coil must be in a position that is substantially parallel to the surface of the object to which the label is affixed. A first drawback of this arrangement is that, in order to enable the transmission of power and data between a reader of the above type and the label, the antenna of the reader must be oriented so that its axis is pointed substantially in the axial direction of the coil of the antenna of the label. The result thereof is that it is impossible to read the label in a sure way without taking care over the relative orientation of this label with respect to the reader. Furthermore, the label needs to be placed in a position where it is mechanically protected. In the case of gas cylinders, this is done by placing the label in the vicinity of the control valve, within the protective cup of this control valve, in a plane substantially perpendicular to the axis of the cylinder. To provide for the efficient transmission of power between the reader and the antenna of the label, it would be necessary to place the antenna of the reader in an axial alignment with the antenna of the label. This is practically impossible within the cup for reasons of space, and if the reader is placed outside the cup, the latter forms a screen that greatly disturbs transmission.

Consequently, although labels with ferrite rod type antennas have certain advantages notably in terms of space requirements, there are many objects, notably gas cylinders, on which these labels, when affixed thereto, cannot be read reliably and easily by means of a reader provided with a standard antenna.

In order to overcome the above problems and enable a reliable identification of objects provided with electronic labels while, at the same time, limiting the constraints related to the reading of these labels, the inventor has already developed an approach consisting of the use of:

a label comprising a coil with an axis, and a reader having one or more transmission/reception devices offset in angular fashion about a median axis, each transmission/reception device of the reader comprising two substantially parallel bars on which there are respectively wound two coils having respective ends located substantially in one and the same plane and forming two poles that are substantially parallel and located in said plane, substantially parallel to said axis, in a configuration such that the field generated has opposite orientations in the two bars so that at least a part of the lines of said magnetic field can get looped in the magnetic circuit in passing into the coil of the label along the direction of the axis of said coil when the reader is placed in the vicinity of said label.

This system has the advantage wherein, with the two coils being wound so that a magnetic flux is created from one coil to the other in flowing through the coil of the label, the power transmitted and the sensitivity of reception are practically doubled.

Through this system, it is possible to achieve the reliable reading of an electronic label comprising a ferrite rod type antenna placed in a parallel position against or close to the surface of an object provided that the reader can be brought to the vicinity of this surface, substantially perpendicularly to this surface. Hence, through this system, it is possible to read such an electronic label in a reliable way even when protection means surround the label, as is the case for example for gas cylinders with protective cups.

The inventor has also proposed an electronic label comprising a foil made of electrically conductive non-magnetic metal alloy, the antenna extending to the direct vicinity of the foil, the axis of the coil being parallel to this foil.

Indeed, during the reading of a label having an antenna formed by a coil wound around a ferrite rod placed in a position that is parallel to the surface of the object, the magnetic flux emitted by the reader goes partly beside the antenna, in forming a leakage flux despite the flux-concentrating capacity of the ferrite rod. Depending on the nature of the material of the object, this leakage flux may be substantially modified, thereby disturbing the flux that flows through the ferrite rod. Thus, for example, if the object is made of magnetic material, for example steel, a major part of the flux emitted will flow into this material to the detriment of that part of the flux which goes through the ferrite of the label. Conversely, if the material of the object is non-magnetic, it acts as a reflector for the magnetic field, the reflected field lines disturbing the emitted field in the vicinity of the antenna. There may even be the risk of that these field lines will create by interference field nodes where the field gets cancelled. Consequently, the power received by the label and the general behavior of this label are variable as a function of the constituent material of the object. This gives rise to variations in reading conditions and notably variations in the acceptable distance between the reader and the label.

The above-defined label makes it possible to overcome this problem by making the behavior of the label independent of the nature of the support to which it is affixed, the foil of non-magnetic conductive material fulfilling the role of a screen that always acts in the same way whatever may be the underlying material.

The invention is aimed at improving the above label and system and at enabling a surer identification of objects provided with electronic labels while at the same time limiting the constraints related to the reading of these labels.

SUMMARY OF THE INVENTION

With these aims in view, an object of the invention is an electronic label for an object identification system provided with such a label, comprising an electronic module coupled with an antenna for the reception and transmission of electromagnetic waves, said antenna comprising a coil having an axis and being wound about a ferrite rod that is elongated in the direction of this axis, wherein said label comprises a first foil made of a material that conducts magnetic fields and has a low coercive field, the antenna extending to the direct vicinity of the foil, the axis of the coil being parallel to this foil.

The label according to the invention therefore proposes the improvement of the flux-concentrating capacity of the label by the positioning of a foil made of a magnetic alloy that is preferably a very good conductor of magnetic fields and has a low coercive field (for example an alloy of the mu-metal type), in order to drain the field lines towards the label. This makes it possible, for equal distances between the reader and the label, to increase the power received by the label and, for equal values of power received, to position the reader at a greater distance. Furthermore, it improves immunity to noise resulting from disturbances introduced by the environment of the label (for example through the presence of a control valve in a gas cylinder).

An object of the invention is also a system for the identification of objects surrounded by a protective cup comprising, firstly, an electronic label provided with an antenna for the reception and transmission of electromagnetic waves comprising a coil having an axis and, secondly, a label reader associated with data terminals and comprising a device for the transmission/reception of these waves, comprising means to generate a magnetic field in a magnetic circuit, the magnetic circuit comprising two bars spaced out with respect to one another, having substantially parallel axes, having respective ends located substantially in one and the same plane that is substantially perpendicular to said axes and constituting two poles, the distance between the poles being such that at least a part of the lines of said magnetic field can get looped in the magnetic circuit in flowing into the coil of the label in the direction of the axis of said coil when the reader is placed in the vicinity of said label, wherein the transmission/reception device comprises plates made of a material that conducts magnetic fields and has a low coercive field, said plates being positioned so as to be substantially parallel to the bars, between these bars and the protective cup.

Thus, the system of the invention proposes the use of plates made of mu-metal type to form a reinforced screen between the bars and the protective cup. These foils concentrate the disturbance-causing leakage fluxes (the disturbances being the mistuning of the antennas) that would normally be sent towards the protective cup, these fluxes being reintroduced into the bars by means of the foils.

Finally, an object of the invention is also a system such as the one defined here above for the identification of containers closed by a control valve surrounded by a protective cup, wherein the label comprises:

- a layer of insulator material placed at the bottom of the protective cup around the control valve,
- an electronic module associated with an antenna comprising a coil wound on a ferrite rod, the antenna being fixed to the layer, parallel to the surface of this layer, and
- a first foil made of a material that is a conductor of magnetic fields and has a low coercive field, this foil extending above the antenna.

BRIEF DESCRIPTION OF THE DRAWINGS

Other features and advantages of the invention shall appear from the following description, given by way of an example, of a system for the identification of gas cylinders and a label for such cylinders according to the invention.

Reference shall be made to the appended drawings, of which.

MORE DETAILED DESCRIPTION

Figure 1:
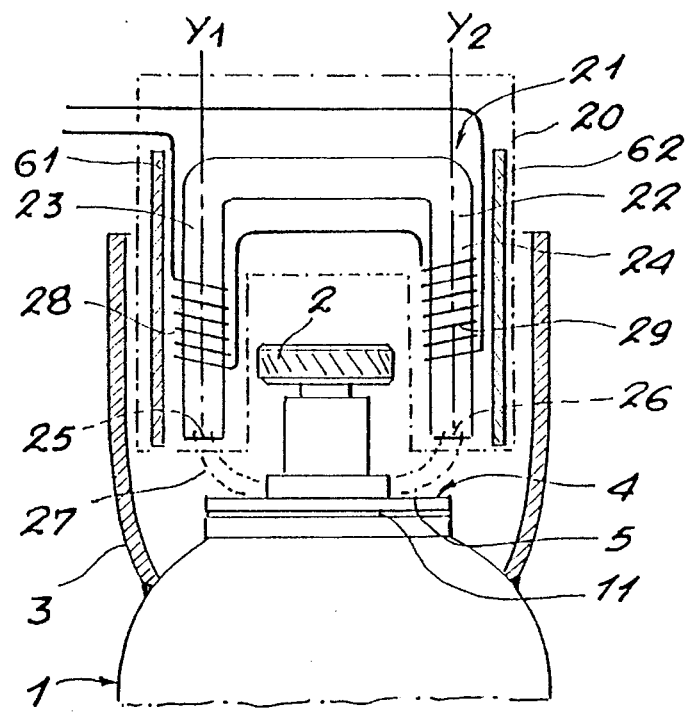
FIG. 1 gives a schematic view of the reader during the reading of a label placed on a gas cylinder.

The drawing of FIG. 1 shows the upper part of a gas cylinder 1 comprising a control valve 2 and a protective cup 3 surrounding the control valve.

An electronic label 4 is placed at the bottom of the protective cup against the wall 11 of the cylinder 1.

Figure 2:
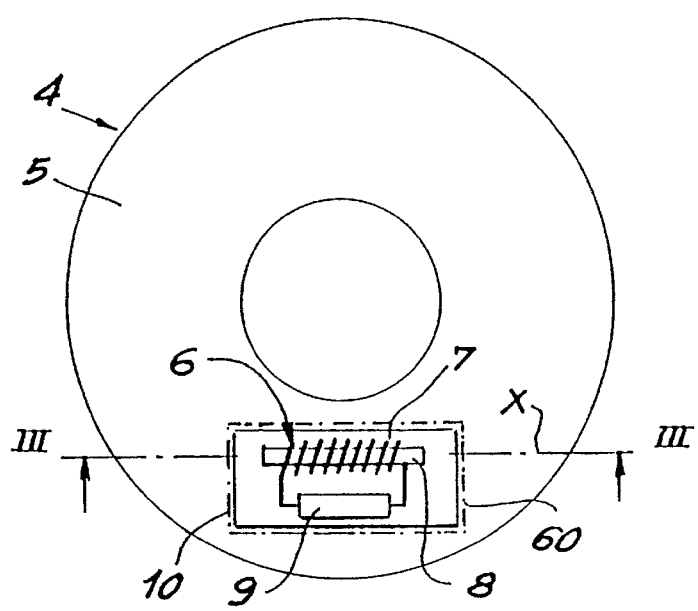
FIG. 2 is a top view of the label.
Figure 3:
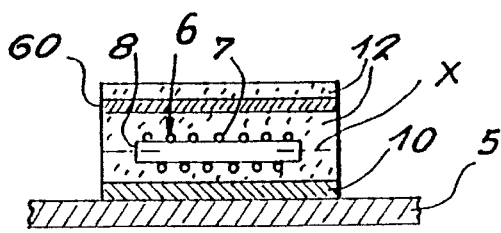
FIG. 3 is a sectional view along the line III—III of FIG. 2.

As can be seen more clearly in FIGS. 2 and 3, the label 4 comprises a stack of successive layers formed by:

a flat ring 5 made of plastic fixed to the cylinder, and surrounding the connector of the control valve 2, a foil 10 made of non-magnetic material with low electrical resistivity, an antenna 6 for the reception and transmission of electromagnetic waves that is formed by a coil 7 wound about a ferrite rod 8 extending along an axis X, this antenna 6 being coupled with an electronic module 9, such as an integrated circuit chip, of a known type in order to provide for the identification of the label. The antenna extends along the axial direction X of the rod, parallel to the surface of the ring 5 and hence in a direction substantially parallel to the surface of the wall 11 of the cylinder, and in a direction that is tangential to said ring, a foil 60 made of a material that is a very good conductor of magnetic fields and has a low coercive field (or residual coercive field). Typically, the material used will be a mu-metal type alloy. The unit formed by the antenna 6 and the foil 60 is preferably surrounded by or coated with an insulator material 12, for example a plastic, to form a protection for the antenna and the foil 60.

During the reading of a label comprising an antenna formed by a coil wound about a ferrite rod located in a position parallel to the surface of the object, the magnetic flux emitted by the reader flows partly beside the antenna, forming a leakage flux, despite the flux-concentrating capacity of the ferrite rod. Depending on the nature of the material of the object, this leakage flux may be substantially modified, thereby disturbing the flux that flows in the ferrite rod. Thus, for example, if the object is made of a magnetic material such as steel for example, a major part of the flux emitted will flow into this material, to the detriment of the part of the flux that flows through the ferrite of the label. Conversely, if the material of the object is non-magnetic, it will act as a reflector for the magnetic field, the reflected field lines disturbing the emitted field in the vicinity of the antenna, and there is even the risk that these reflected field lines may create field nodes by interference, where this field gets cancelled. Consequently, the power received by the label and the general behavior of the label are variable as a function of the constituent material of the object. This prompts variations in reading conditions and notably variations in the acceptable distance between the reader and the label.

The foil 60 extends to the entire label and preferably beyond the ends of the ferrite rod 8. The presence of this foil 60 results in a deformation of the magnetic flux generated by the reader in a sense that tends to increase the number of field lines going through the label and hence the power received. Furthermore, this foil 60 is a shield between the label and the control valve. It is desirable to reduce the thickness of this foil to the greatest possible extent to limit the space occupied by the label. However, the thickness must be at least equal to the skin thickness of the magnetic material at the frequency considered so that the effect of this layer may be significant. The skin thickness is defined as the thickness of the material providing for electrical conduction at a given frequency.

The type of material used to make the foil 60 will depend on the field generated by the reader. Indeed, for optimum output, the material to be used should not get saturated under the effect of the field to which it will be subjected. There are at least a hundred mu-metal type alloys. They range from certain alloys that get saturated under the effect of the earth's magnetic field up to types of alloys that may be called non-saturable (the field to which the latter have to be subjected in order to get saturated being in fact very great). In the context of the invention, the material chosen will be preferably a material that is not saturable by the field generated by the reader (the non-saturation will therefore be relative).

As regards the dimensions of the foil 60, they will depend on:

the tuning frequency of the antennas, which determines the skin thickness, the diameter of the ferrite which will determine the optimum distance between the antenna and the foil 60, and constraints related to space availability.

In practice, the smaller the distance between the mu-metal and an antenna, the greater will be the shielding effect (indeed, more leakage flux is picked up), but the lower will be the power transmitted (by the looping of the leakage flux in the antenna).

In one embodiment, the inventor uses a foil made of non-saturable mu-metal having the dimensions of the label, with a thickness of 0.1 mm (for a tuning frequency of 125 kHz) and at a distance of 1.1 mm from the antenna.

In theory, the optimum distance between the mu-metal foil and the antenna is substantially equal to three times the diameter of the ferrite. If we consider a ferrite with a diameter of 6 mm, it will clearly be understood that this would lead to a substantial label thickness (>24 mm). By means of tests, the inventor has shown that a distance of over 1 mm is enough.

The foil 10 is, for example, made of copper or copper alloy and preferably extends beyond the ends of the ferrite rod 8. This foil has the role of performing a reflecting screen for the radiofrequency waves conveyed by the magnetic flux generated by the reader during the reading of the label or the writing on this label. It is similarly desirable to reduce this thickness to the greatest possible extent to limit the amount of space required by the label. However, the thickness should be at least equal to the skin thickness of the non-magnetic material at the frequency considered so that the effect of this metal layer is significant. The foil 10 could be made by a metallization of the ring or, in other applications, of the support of the antenna, made by a known type of method of vacuum deposition of the said non-magnetic metal alloy or by any other technique of deposition such as electrolytic deposition, chemical deposition or by the pasting of a metal foil.

The drawing of FIG. 1 also shows a device 21 for the transmission/reception of electromagnetic waves from a reader 20, shown in a schematic view. The shape of this device 21 is adapted to penetrate the protective cup 3. The transmission/reception device has means to generate a magnetic field in a magnetic circuit. This magnetic circuit is formed by an element 22 made of magnetic material. This element 22 is, for example, U-shaped and has two bars forming the arms 23, 24 of the "U". The ends of the "U" form two poles 25, 26 having axial directions Y1, Y2 that are substantially parallel and located in one and the same plane substantially perpendicular to said axial directions.

The two poles 25, 26 are spaced out at a distance such that the lines 27 of the magnetic field flowing into the magnetic circuit get looped in passing into the ferrite rod 8 when the reader is brought close to the label. The ferrite rod will thus play a role in the closing of the magnetic circuit and, in having a effect of concentrating the field lines, it will optimize the flux going through the coil 7 of the label.

The magnetic field generation means are preferably formed by two coils 28, 29 wound about the arms 23, 24 in a sense that is suited to making the flux rotate in the magnetic circuit, i.e. such that the field generated by each of the coils in the respective arms takes an opposite orientation.

The reader furthermore has two plates 61 and 62 made of a material that is a very good conductor of magnetic fields and has a low coercive field. These two plates 61 and 62 are positioned in the vicinity of the arms 22 and 23. In practice, the material used for the plates 61 and 62 will be identical to the material used for the foil 60, these plates and the foil being subjected to the same magnetic field. These plates are substantially parallel to said bars and are respectively interposed between one of the bars and the protective cup 3. They thus form a shield between the antennas and the protective cup. Preferably, these plates extend beyond the ends of the bars (see FIG. 1) and extend over a width that is greater than the diameter of the bars (see FIG. 3). For example, taking bars with a diameter of 6 mm and a height of 30 mm, plates will be used with a width of 11 mm and a height of 35 mm. Thus, greater control is obtained over leakages on the edges of the bars. As for the thickness of the plates and the distance between a plate and a bar, these factors are subjected to the same constraints as in the case of the foil of the label. In practice, a greater plate-bar distance could be defined, the constraints related to space requirements being less critical for the reader than for the label.

During the reading of a label, in placing the reader near the label, the field lines tend to be channelled for the ferrite rod 8. However, a part of these lines gets dispersed and there is therefore a leakage flux that is lost. This phenomenon could be all the more intense with the reader according to the invention as the arrangement of the poles tends to give rise to a spreading of the field lines between these poles.

In each plate 61 and 62, a field will thus be created under the effect of the field generated by the poles. The field created in each plate will have a orientation opposite that of the field created in the bar next to which it is located. In this way, for each bar, the leakage flux towards the protective cup will tend to be channelled in the plate adjoining this bar and to be reintroduced into this bar.

The density of this leakage flux is variable firstly as a function of the relative position of the reader and the label and secondly as a function of the nature of the neighboring materials. Thus, for example, in the vicinity of a magnetic metal mass such as that of a steel cylinder, the leakage flux drained through this mass and consumed by the magnetization of this mass will be great and will bring about a corresponding reduction in the useful flux flowing through the coil of the receiver. However, if the metal mass is non-magnetic, for example if it is an aluminium cylinder, the magnetic field is reflected.

This is why, the label according to the invention comprises the foil 60 made of a highly magnetic material which, firstly, forms a shield between the label and the control valve and, secondly, enables the field lines to be channelled towards the label.

The foil 10 of non-magnetic conductive material forms a shield and reflects the field, and therefore harmonizes the conditions of transmission and reception, whatever may be the nature of the material of the object to which the label is affixed.

In a previous device comprising only the foil 10, the inventor has observed that the tuning frequency of the resonant circuit forming the antenna, constituted by the coil 7 and a tuning capacitance, in bringing the antenna close to a surface made of non-magnetic material, could vary by a factor notably lower than 10%. Comparatively, in the absence of this foil, this variation was greater than 10%.

With the label of the invention which furthermore has the foil 60, the inventor has observed that, under such conditions, the variation is only 1%.

Figure 4:
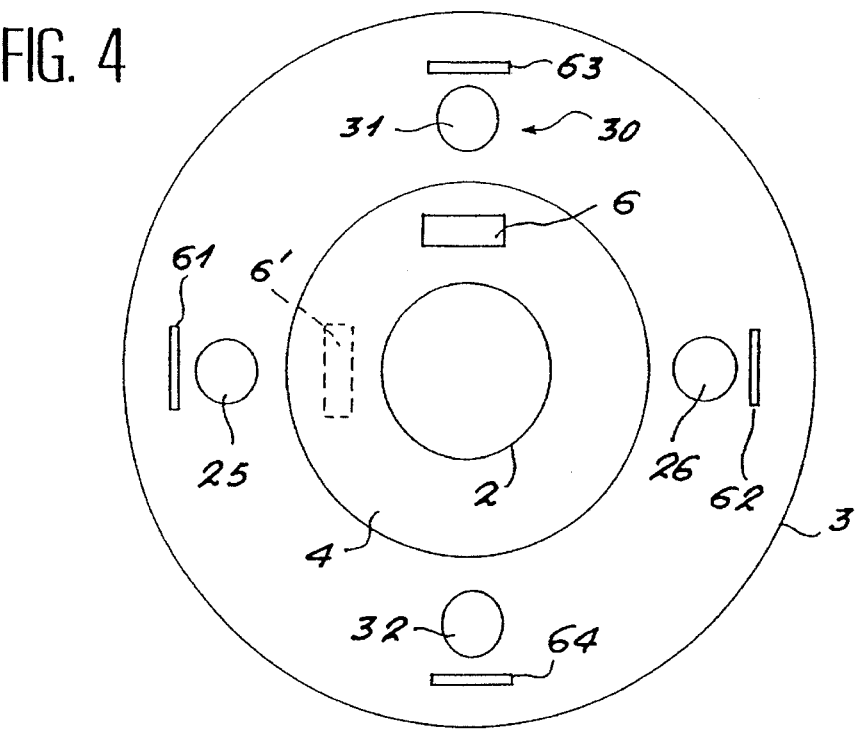
FIG. 4 is a schematic diagram showing the principle of a particular arrangement of the coils of the reader in the case of a reader having two transmission/reception devices.

If the reader has only one transmission/reception device, it may be that, during the reading, the relative orientation of the poles 25, 26 and of the antenna 6 of the label is such that the flux going through the coil 7 of the label is insufficient, for example when, as shown in dashes 6' in FIG. 4, the axial direction X of said antenna is perpendicular to the plane containing said poles. It would then be necessary to change this orientation to enable the reading.

Advantageously, to circumvent this problem, the reader has a second transmission/reception device 30 formed like the device 21 shown in FIG. 1 and offset in angular fashion with respect to the first device about the median axis A of the poles so that the plane of the poles 31, 32 of the second device is, for example and without restricting the scope of the invention, perpendicular to that of the first device. Of course, there will then be two additional plates 63 and 64 of mu-metal available, in order to set up a shield of the second transmission/reception device 30 with respect to the protective cup 3. Thus, whatever the relative position of the reader and the antenna, the reading can be done by at least one of the devices.

This arrangement has the advantage wherein, with the two coils being wound so as to create a magnetic flux from one to the other in flowing through the coil of the label, the power transmitted and the reception sensitivity are practically doubled.

It thus becomes possible to read the label in a reliably manner whatever may be its orientation. Indeed if, during the reading, the antenna of the label happens to be oriented in a direction perpendicular to that defined by the two poles of one of the devices, which would prevent the transmission of the flux through the coil, this transmission could nevertheless be achieved by another of these devices since this device, offset in angular fashion, could at least partially transmit the flux through said coil of the label.

It will easily be understood that the reading could be done even more reliably in any position by the use of more than two transmission/reception devices distributed in different positions so as to cover the different orientations that may be taken by the antenna of the label.

Figure 5:
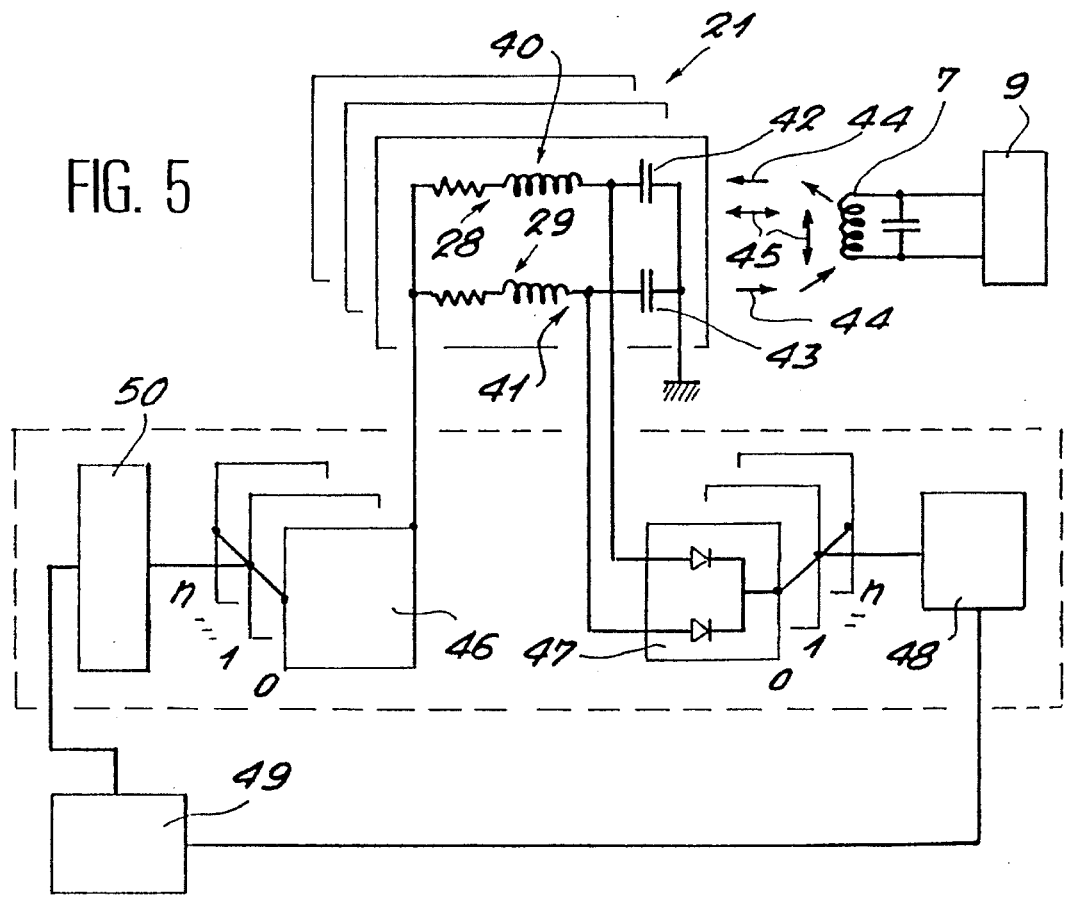
FIG. 5 is an electrical diagram of the reader comprising several switch-over transmission/reception devices.

The drawing of FIG. 5 is a simplified block diagram of the reader comprising a plurality of such transmission/reception devices and means for the automatic selection, among these devices, of the device enabling a reliable reading of the label.

This diagram shows several transmission/reception devices 21 referenced 0, 1, . . . , n. Each of these devices has two parallel-connected resonant circuits 40, 41 respectively comprising the coils 28, 29 associated with capacitors 42, 43. The bold arrows 44 symbolically represent the transmission of the power needed for the working of the electronic label. The double arrows 45 similarly represent the exchange of data between the reader and the label by the modulation of the electromagnetic waves transmitted.

Each transmission/reception device 21 is connected to a power and modulation stage 46 and a demodulation stage 47. The outputs of the demodulation stages 47 are connected together to filters 48, from which the signals corresponding to the data elements read are transmitted to a data terminal 49.

The inputs of the power and modulation stages 44 are connected to a selector 50 that supplies them selectively. This selector 50 is itself connected to the terminal 49. When, during a reading operation, the data elements transmitted to the terminal and coming from the signals picked up by one of the devices 21, are not valid, notably because the antenna of the label is not accurately oriented with respect to said device 21, the terminal sends a pulse to the selector 50. This selector 50 then switches over to supply another power and modulation stage and therefore put another transmission/reception device into operation. These operations are renewed until the reading of the label is validated.

The invention is not limited to the arrangements that are described here above solely by way of an example. In particular, the label may be made in a shape different from the ring shape described here above and, instead of the ring 5, it may comprise a simple plate, made of plastic for example, forming a layer of insulating material placed against the foil made of non-magnetic conductor material, on its side opposite the antenna. This plate is used as a support for the antenna and the electronic module. In particular, this plate, while retaining a general ring shape, may be discontinuous. For example, it may be in the shape of a "C". This could make it easier to position it on the cylinder around the control valve. It may also have any other appropriate shape suited to the object to which the label has to be affixed. The label may be fixed to any object, said plate furthermore enabling the foil of non-magnetic conductive material to be insulated from said object, especially when this object is made of metal.

What is claimed is:

1. An electronic label for an object identification system, the electronic label comprising an electronic module coupled with an antenna for the reception and transmission of electromagnetic waves, said antenna comprising a coil having an axis and being wound about a ferrite rod that is elongated in the direction of said axis, and a first foil made of a material that conducts magnetic fields and has a low coercive field, said antenna extending to the direct vicinity of said first foil, and said axis of said coil being parallel to said first foil.

2. A label according to claim 1, comprising a second foil made of a non-magnetic metal alloy that is a conductor of electricity, said antenna extending to the direct vicinity of said second foil, said axis of said coil being parallel to said second foil, and said second foil being separated from said first foil by said coil.

3. A label according to claim 2, comprising a layer of insulator material placed against said second foil, on a face of said second foil opposite said antenna.

4. A label according to claim 3, wherein said layer of insulator material comprises a flat plastic ring.

5. A system for the identification of objects having a protective cup, said system comprising:

an electronic label provided with an antenna for the reception and transmission of electromagnetic waves, said antenna comprising a coil having an axis, and a label reader associated with a data terminal, said label reader comprising a device for the transmission/reception of said electromagnetic waves, said transmission/reception device comprising means for generating a magnetic field in a magnetic circuit, said magnetic circuit comprising two bars spaced out with respect to one another, having substantially parallel axes, having respective ends located substantially in one and the same plane that is substantially perpendicular to said axes and constituting two poles, the distance between said two poles being such that at least a part of the lines of said magnetic field can get looped in said magnetic circuit in flowing into said coil of said label in the direction of said axis of said coil when said label reader is placed in the vicinity of said electronic label, and plates made of a material that conducts magnetic fields and has a low coercive field, said plates being positioned so as to be substantially parallel to said two bars, between said two bars and said protective cup.

6. A system according to claim 5, wherein said material forming said plates is non-saturable by said magnetic field produced in said magnetic circuit.

7. A system according to claim 5, wherein said means for generating said magnetic field further comprises two coils wound respectively on said two bars in a configuration such that said magnetic field generated has opposite orientations in said two bars.

8. A system according to claim 5, wherein said label reader further comprises several additional transmission-reception devices, offset in angular fashion about a median axis, and automatic selection means to automatically switch over the supply from any first device of these devices to any second device of these devices when data elements received by said data terminal from said first device are considered to be not valid.

9. A system according to claim 5, wherein said electronic label further comprises:

a layer of insulator material placed at the bottom of said protective cup around a control valve surrounded by said protective cup, an electronic module associated with said antenna comprising a coil wound on a ferrite rod, said antenna being fixed to said layer of insulator material, parallel to the surface of said layer, and a first foil made of a material that is a conductor of magnetic fields and has a low coercive field, said first foil extending above said antenna.

10. A system according to claim 9, wherein said label includes a second foil made of a non-magnetic metal alloy that is a conductor of electricity, said antenna extending to the direct vicinity of said second foil, said coil having an axis parallel to said second foil, and said second foil being separated from said first foil by said coil.

11. A method of identifying an object, the method comprising the steps of providing said object with an electronic label including an electronic module coupled to an antenna, said antenna having a antenna coil wound around a ferrite rod;

forming a magnetic circuit, said forming step including the step of placing opposite poles of a label reader at opposite poles of said ferrite rod, said magnetic circuit thereby being formed of said antenna and said label reader, said label reader comprising a first transmission/reception device having a U-shaped bar wound with a first reader coil;

generating magnetic flux in said magnetic circuit with said label reader;

increasing magnetic flux flowing through said antenna and simultaneously shielding said antenna from magnetic flux reflected by said object, said increasing and shielding steps being performed by a first foil made of a material that conducts magnetic fields, said first foil being placed on a first side of said antenna;

reflecting radio frequency waves conveyed by said magnetic flux generated by said label reader during said generating step, said reflecting step being performed by a second foil made of a non-magnetic metal alloy that is a conductor of electricity, said second foil being placed on a second side of said antenna opposite said first side; and reading said electronic label provided on said object with said label reader.

12. A method according to claim 11, further comprising the step of placing a layer of insulator material against said second foil, on a face of said second foil opposite said antenna.

13. A method according to claim 12, wherein said layer of insulator material is a flat plastic ring.

14. A method according to claim 11, wherein during the reading step said label reader is inserted into a circular protective cup of said object, and further comprising the steps of placing a first plate between a first side of said U-shaped bar and said protective cup, said first plate being placed substantially parallel with said U-shaped bar; and placing a second plate between a second side of said U-shaped bar and said protective cup; said second plate being placed substantially parallel with said U-shaped bar.

15. A method according to claim 11, wherein said U-shaped bar is also wound with a second reader coil, wherein said first reader coil is wound on a first leg of said U-shaped coil, wherein said second reader coil is wound on a second leg of said U-shaped coil, and further comprising the steps generating a first magnetic field with said first coil in said first leg, and generating a second magnetic field with said second coil in said second leg, the orientation of said second magnetic field in said second leg being opposite the orientation of said first magnetic field in said first leg.

16. A method according to claim 11, further comprising the step of providing said label reader with a second transmission/reception device, said second transmission/reception device being offset from said first transmission/reception device.

17. A method according to claim 16, further comprising the step of automatically selecting between said first and second transmission/reception devices.

18. A method according to claim 17, wherein said automatically selecting step is performed based on the quality of transmission between said first and second transmission/reception devices and said electronic label.

19. A method according to claim 17, wherein said label is further provided with a plurality of additional transmission/reception devices, and wherein during said automatically selecting step the selection is further between said first, second and said plurality of additional transmission/reception devices.

20. A method according to claim 16, wherein said first and second transmission/reception devices have a common median axis, and wherein said first and second transmission/reception devices are offset in angular fashion about said common median axis.

* * * * *